(12) United States Patent
Alford

(10) Patent No.: US 7,513,617 B1
(45) Date of Patent: Apr. 7, 2009

(54) EYEGLASSES WITH BUILT IN ENCLOSURE

(75) Inventor: Kewin Alford, 2266 Sunkist Country Club Rd., Biloxi, MS (US) 39532

(73) Assignee: Kewin Alford, Biloxi, MS (US)

( * ) Notice: Subject to any disclaimer, the term of this patent is extended or adjusted under 35 U.S.C. 154(b) by 0 days.

(21) Appl. No.: 11/982,060

(22) Filed: Nov. 2, 2007

(51) Int. Cl.
*G02C 5/08* (2006.01)
(52) U.S. Cl. .......................................... 351/63; 351/153
(58) Field of Classification Search ................ 351/41, 351/63, 153; 16/228
See application file for complete search history.

(56) References Cited

U.S. PATENT DOCUMENTS 3,476,466 A * 11/1969 Hopkins ...................... 351/115
6,102,541 A * 8/2000 Kuo ............................. 351/63
7,198,366 B2 * 4/2007 Gao ............................. 351/63

* cited by examiner

*Primary Examiner*—Huy K Mai

(57) ABSTRACT

Eyeglasses whose temple bars each have a U shaped cross section. The temple bars are each held in place by a unique ball joint assembly. When the temple bars are folded, the frame member of the eyeglasses can reside within the hollow area formed by hollow space created by the two U shaped cross sectional temple bars. One temple bar encloses the top half of the frame. The second temple bar encloses the bottom half of the frame. A preferred embodiment includes the temple bars each have a cut out portion corresponding to the location of the wearer's ears so that the temple bar can rest comfortably on the wearer's ear. A preferred embodiment includes to portion of the cut out portion that interacts with the wearer's ear includes an overlay of resilient material located where the ear and the temple bar interact.

4 Claims, 10 Drawing Sheets

EYEGLASSES WITH BUILT IN ENCLOSURE

CROSS REFERENCE TO RELATED APPLICATIONS

Not Applicable

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of eyeglasses and more specifically to eyeglasses with a built in enclosure feature.

Eyeglasses of various types are well known. They are typically comprised of a frame member that supports a pair of lenses and a pair of temple bars. The left temple bars is hingedly attached to the left side of the frame and the right temple bar is hingedly attached to the right side of the frame. The uses for eyeglasses include the use of corrective lenses for people who have less than perfect vision, as well as sun glasses for eye protection from the rays of the sun, and also safety glasses worn by people who are in close proximity to flying debris.

Typically, when a pair of eyeglasses are folded in the stored position, the temple bars reside behind the frame. Because the temple bars are folded behind the frame, the lens portion of the glasses remains exposed and can become scratched unless they are covered by an eyeglass case or sleeve of some sort. The deficiency of the prior art is that a separate case or sleeve is needed to protect folded eyeglasses. A separate case is problematic in that it can be lost or forgotten thereby increasing the chance of the lenses of the folded eyeglasses to become scratched or dirty.

BRIEF SUMMARY OF THE INVENTION

The primary object of the invention is to provide an eyeglass design that has a protective eyeglass enclosure feature built into the temple bars of the eyeglasses.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed eyeglasses with built in enclosure comprising: a pair of lenses, a lens frame, a pair of temple bars, a pair of ball joint members, said lenses attached to said lens frame in a standard way, said ball joint members each comprised of an elongate rod member terminating at each end in a ball shaped portion, each said temple bar having a U shaped cross section, each said temple bar terminating at one end in a ball receiving socket, said lens frame terminating at each end in a ball receiving socket, and said temple bars, when seen from a top view, shaped to conform to the shape of said lens frame when seen from the top view so that when said temple bars are folded, said temple frame and said lenses reside within the confines of said U shaped cross section of said temple bars, one said temple bar enclosing the top half of said frame member and the second said temple bar enclosing the bottom half of said frame member.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
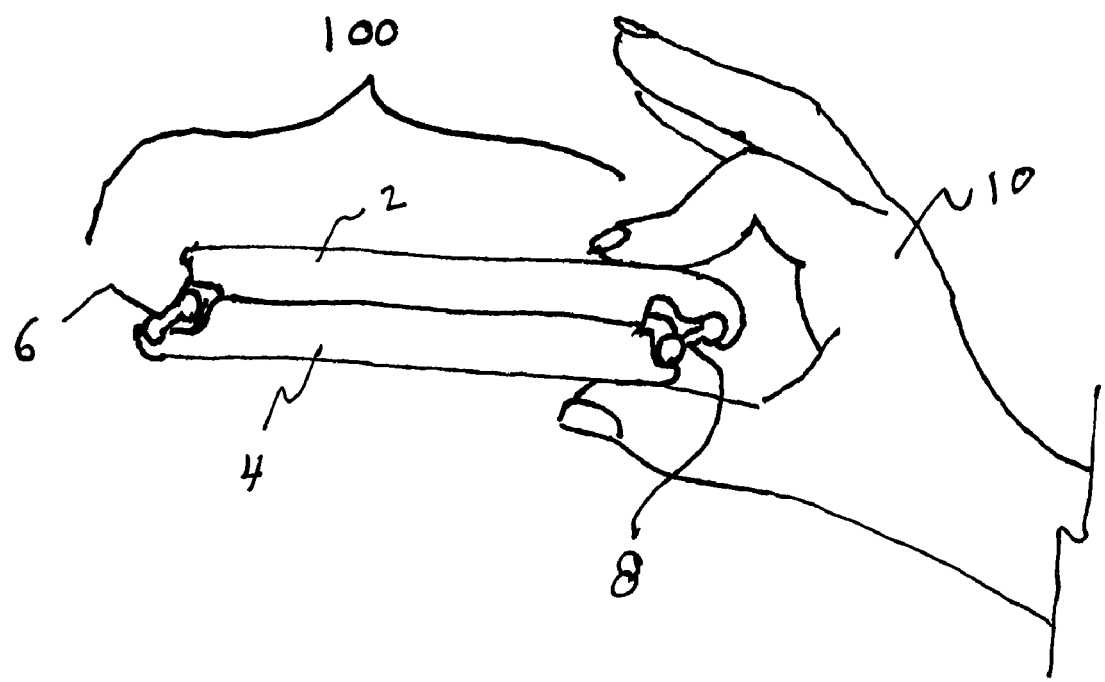
FIG. 1 is a perspective view of a person holding the invention in a folded and stored position.

Referring to FIG. 1 we see a person 10 holding the folded version of the eyeglasses of the present invention 100. Temple bars 2, 4 can be seen as well as ball joint members 6, 8. The eyeglass frame 10 and lenses 14, 16, shown in FIG. 2 are contained within the hollow portion of the temple bars 2, 4.

Figure 2:
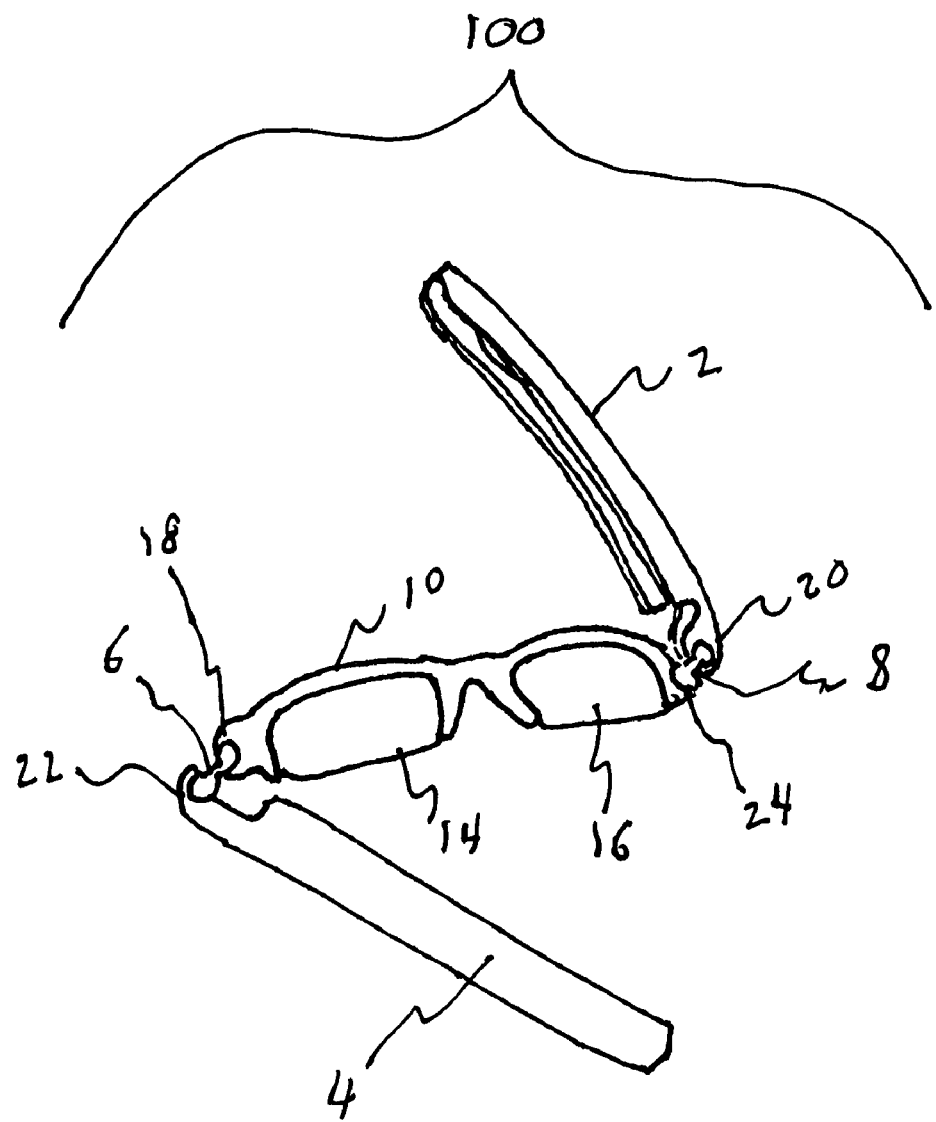
FIG. 2 is a front view of the invention partially opened.

In FIG. 2 we see a partially opened view of the invention 100 revealing eyeglass frame 10 and lenses 14, 16 that have been stored within the hollow portions of temple bars 2, 4. Temple bar 2 stores the top half of the eyeglass frame 10 and temple bar 4 stores the bottom half of eyeglass frame 10. Ball joint members 6, 8 are composed of an elongate rod having a ball shape at each end. The balls of ball joint member 8 are frictionally held within ball receptacle socket 20 at the end of temple bar 2 and ball receptacle socket 24 at the end of frame 10. Similarly, the balls of ball joint member 6 are attached at one end to the ball receptacle socket 18 of eyeglass frame 10 and to ball receptacle socket 22 of temple bar 4. The configuration of the ball joint members 6, 8 and their frictional relationship with frame sockets 22, 24 allow the flexibility for temple bars 2, 4 to twist to a shape that allows frame 10 to be enclosed within the hollow portions of the temple bars 2, 4 and also to twist into position to be used conventionally as a means to hold the eyeglass frame 10 to a person's head by fitting comfortably over the wearer's ears.

Figure 3:
FIG. 3 is a perspective view of a person wearing the eyeglasses of the present invention.

FIG. 3 shows the eyeglasses of the present invention 100 in place on the wearer 10.

Figure 4:
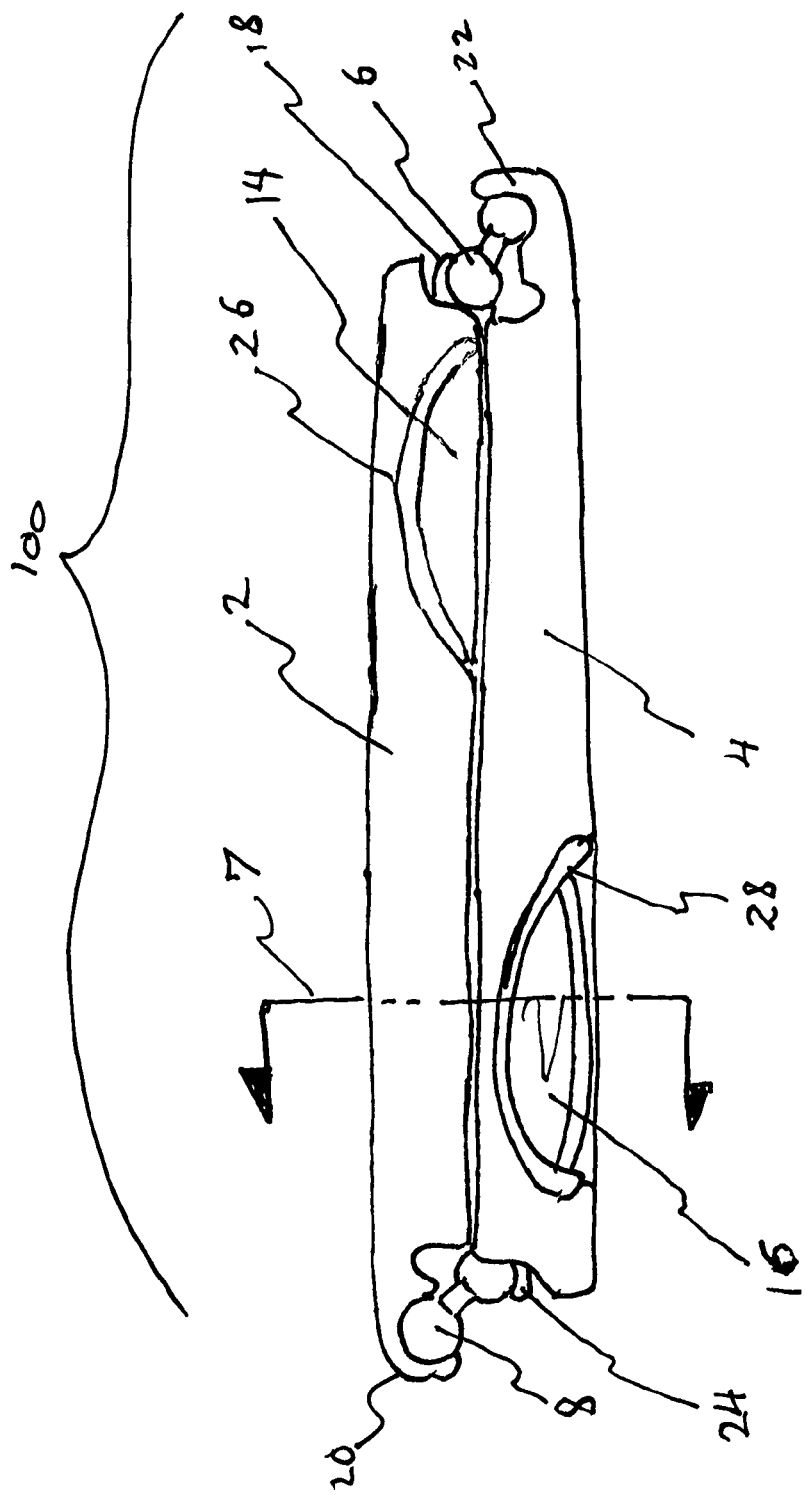
FIG. 4 is a side view of the invention.

FIG. 4 shows a side view of the invention 100. This view is the opposite side of the view shown in FIG. 1. Ear cutout areas are defined by resilient members 26, 28. The wearers ears rest on these resilient members. Lens members 16, 14 can be partially seen through the cutout areas defined by resilient members 26, 28. Ball joint members 6, 8 can be seen in their positions necessary to achieve the folded configuration shown here.

Figure 5:
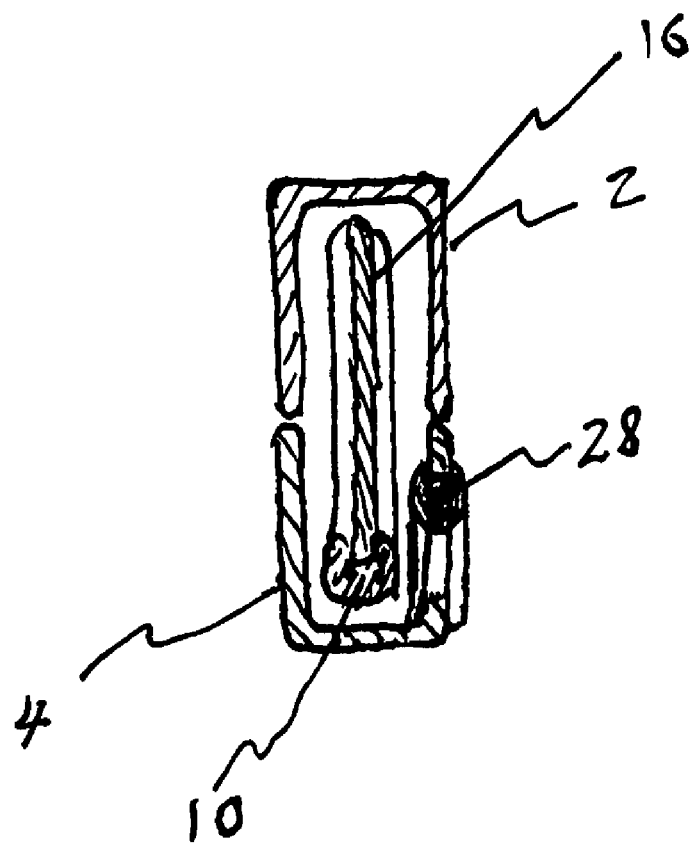
FIG. 5 is a cross section view of the invention.

FIG. 5 shows a cross section view of the invention as defined by section line 7 shown in FIG. 4. This view clearly shows the U shaped cross sectional configuration of temple bar members 2, 4 that allows the frame 10 and lenses 14, 16 to reside within the hollow portion of the temple bars 2, 4. A cross section view of resilient member 28 can also be seen.

Figure 6:
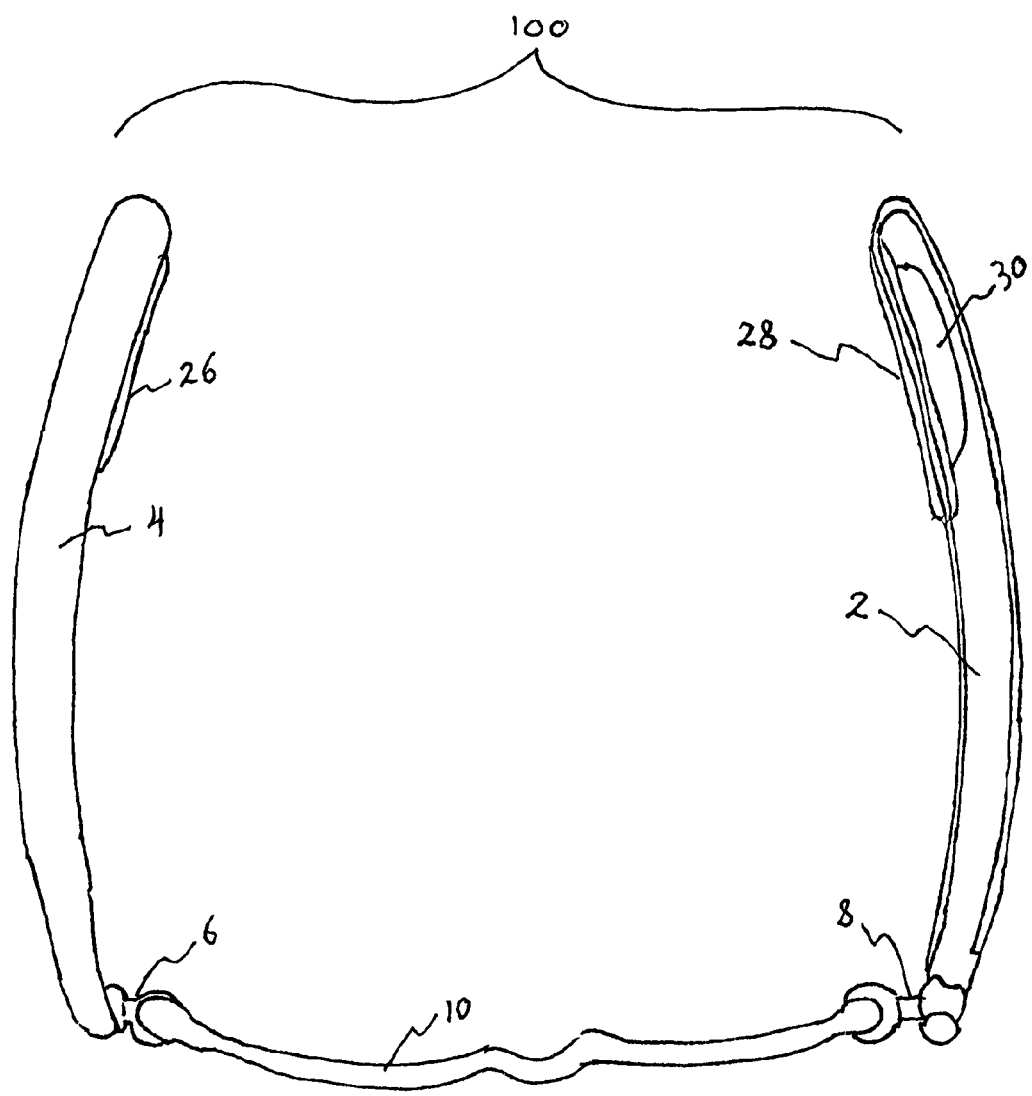
FIG. 6 is a top view of the invention in the open position.

FIG. 6 shows a top view of the invention 100 in the open use position. The wearer's ears rest on resilient members 26, 28. Cutout area 30 allows the wearer's ear to penetrate temple bar 4 so that it can rest on resilient member 28.

Figure 7:
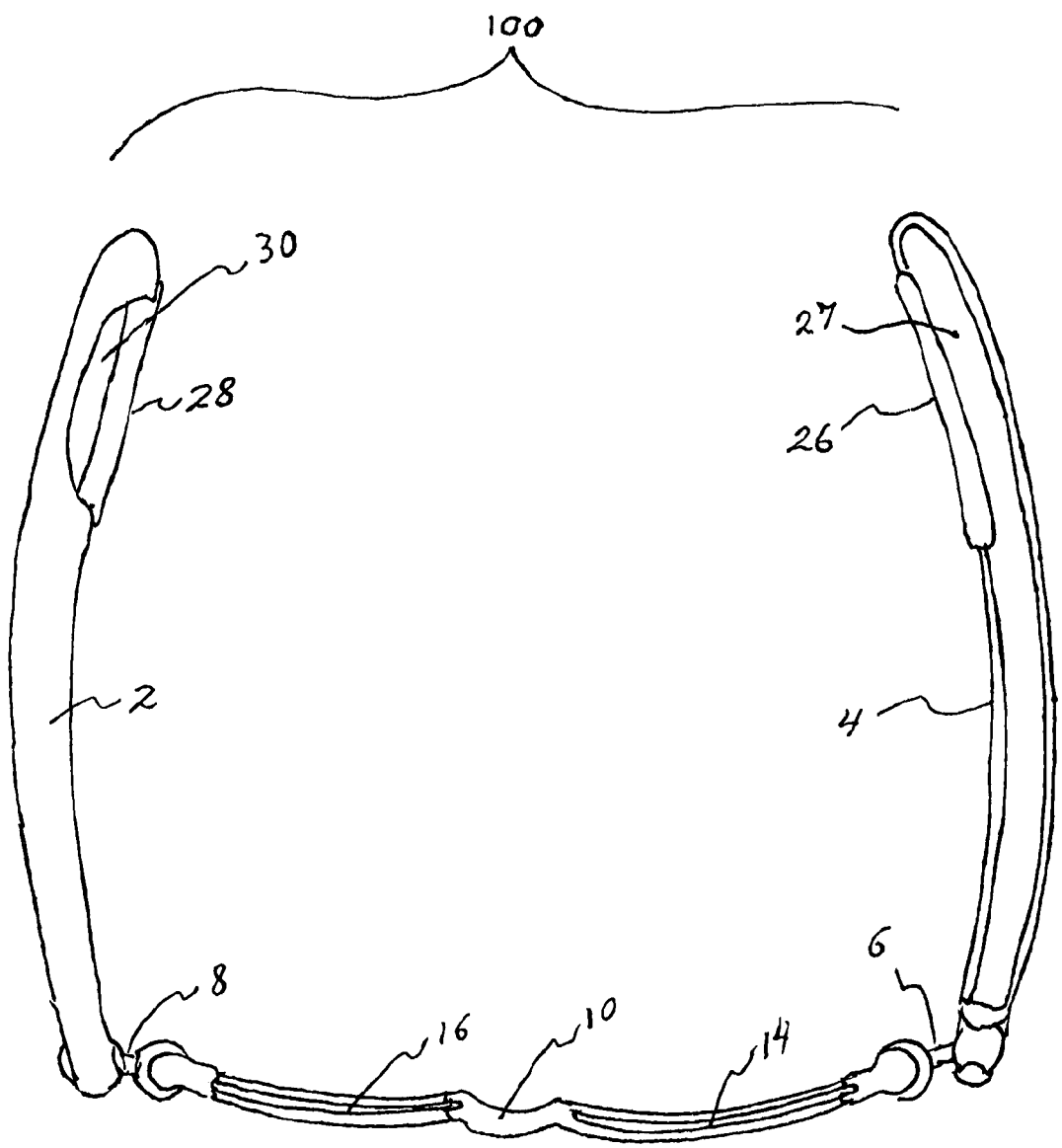
FIG. 7 is a bottom view of the invention in the open position.

FIG. 7 is a bottom view of the invention 100. A portion of the wearer's left ear fits through cutout area 30 and rests on resilient member 28. A portion of the wearer's right ear can reside within the hollow portion 27 of temple bar 4 and engage resilient member 26.

Figure 8:
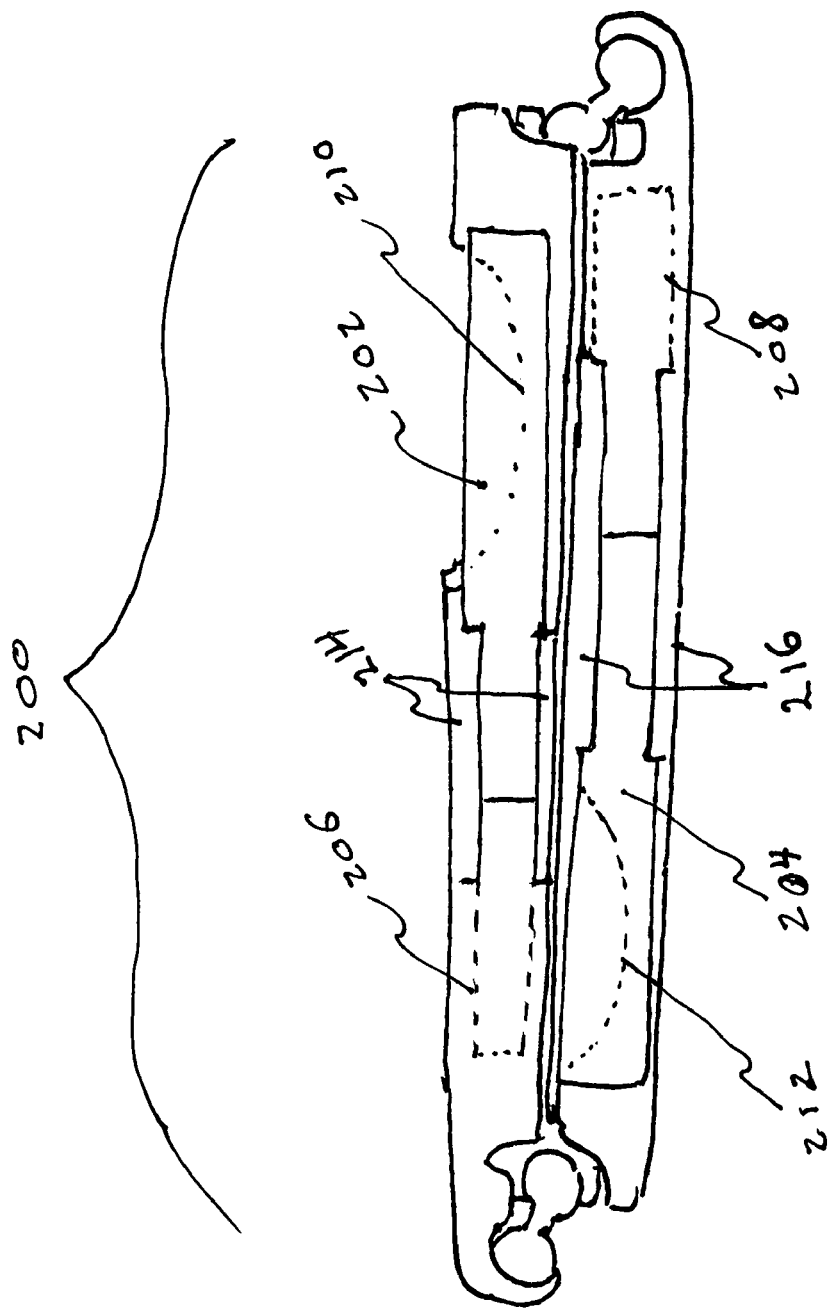
FIG. 8 is an alternate side view of the invention.

FIG. 8 shows an alternate embodiment of the invention 200. The construction of the alternate embodiment is similar to the original construction of the invention 100 except that this embodiment 200 includes sliding covers 202, 204 that cover over the cutout areas represented by dotted lines 210, 212 that are found in the temple bars. Dotted lines 206, 208 show the location of the slide covers 202, 204 when the invention is in the use position, allowing cutout areas 202, 204 to be exposed. Retaining rails 214, 216 slidably retain covers 202, 204 in a standard way.

Figure 9:
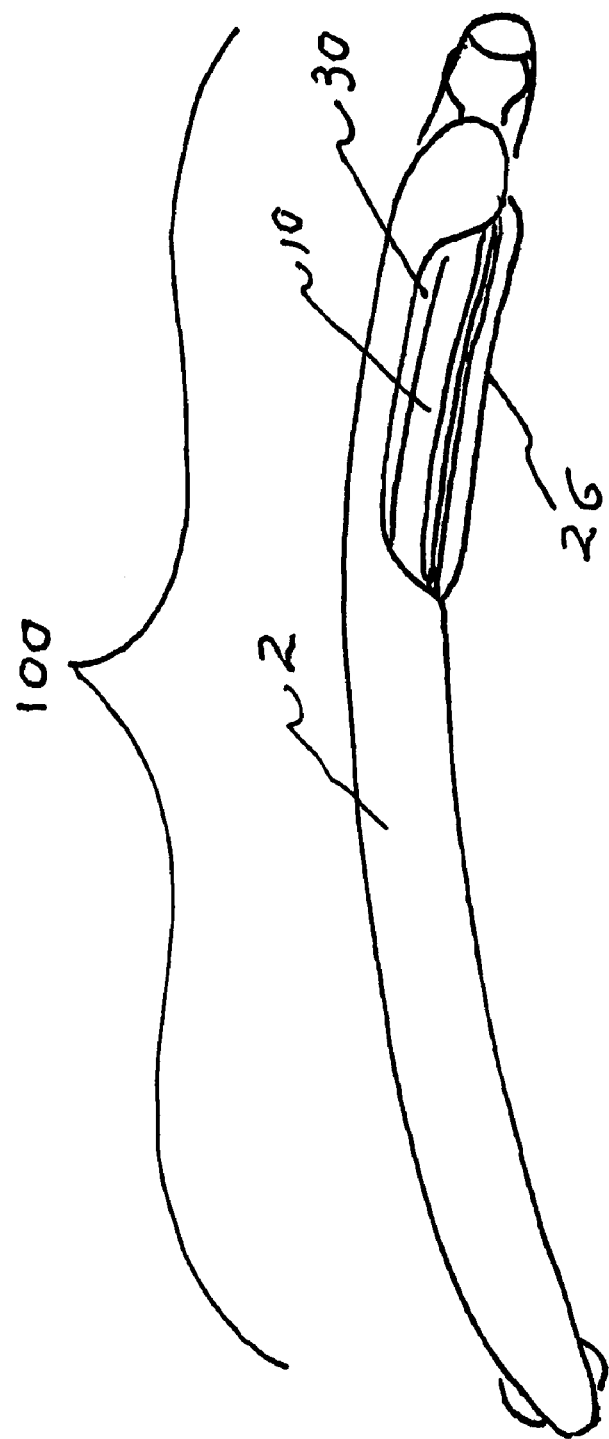
FIG. 9 is a top view of the invention while in a folded position.

FIG. 9 is a top view of the invention 100 in the folded and stored position.

Figure 10:
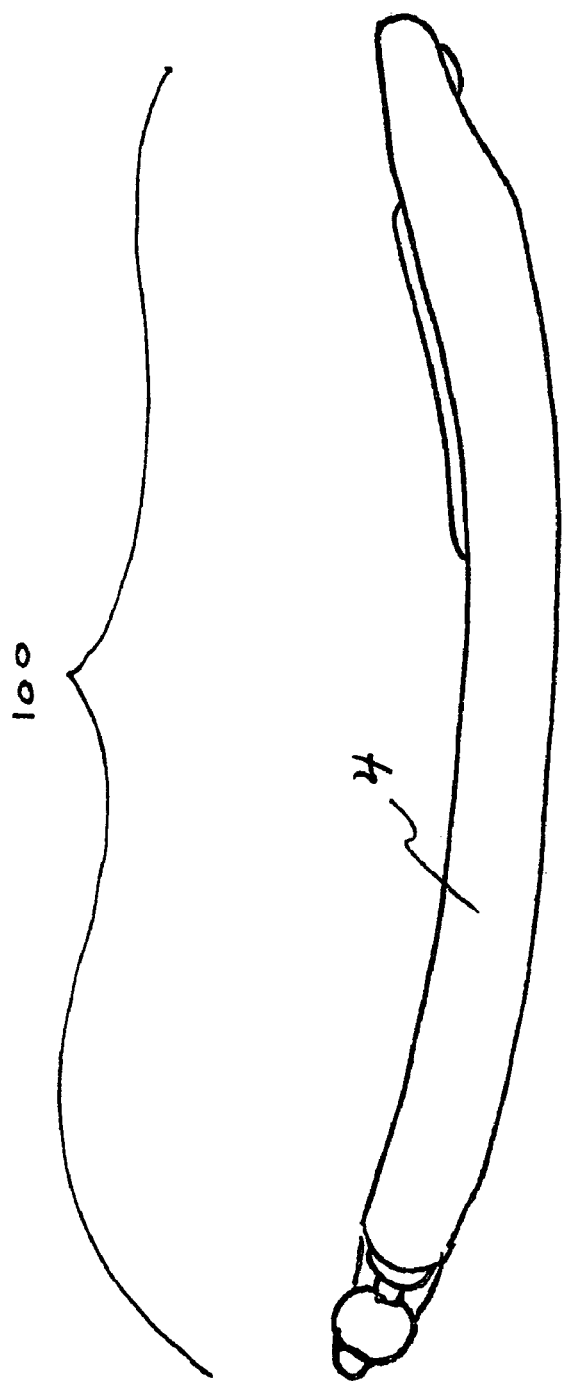
FIG. 10 is a bottom view of the invention while in a folded position.

FIG. 10 is a bottom view of the invention 100 in the folded and stored position.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. Eyeglasses with built in enclosure comprising:
a pair of lenses;
a lens frame;
a pair of temple bars;
a pair of ball joint members;
said lenses attached to said lens frame in a standard way;
said ball joint members each comprised of an elongate rod member terminating at each end in a ball shaped portion;
each said temple bar having a U shaped cross section;
each said temple bar terminating at one end in a ball receiving socket;
said lens frame terminating at each end in a ball receiving socket; and
said temple bars, when seen from a top view, shaped to conform to the shape of said lens frame when seen from the top view so that when said temple bars are folded, said temple frame and said lenses reside within the confines of said U shaped cross section of said temple bars, one said temple bar enclosing the top half of said frame member and the second said temple bar enclosing the bottom half of said frame member.

2. Eyeglasses with built in enclosure as claimed in claim 1 wherein said temple bars each have a cut out portion corresponding to the location of the wearer's ears so that said temple bar can rest comfortably on said wearer's ear.

3. Eyeglasses with built in enclosure as claimed in claim 2 wherein to portion of said cut out portion that interacts with said wearer's ear includes an overlay of resilient material located where the said ear and the said temple bar interact.

4. Eyeglasses with built in enclosure as claimed in claim 1 further comprising a cut out portion cover the is slidably held in place on the side wall of each said temple bar that is capable of covering said cut out portion when said eyeglasses are in the folded and stored position.

* * * * *